United States Patent [19]

Rist

[11] 3,817,362

[45] June 18, 1974

[54] TORSION DAMPING DEVICE

[75] Inventor: Michel Rist, Boulogne, France

[73] Assignee: Societe Anonyme Francaise Du Ferodo, Paris, France

[22] Filed: Nov. 14, 1972

[21] Appl. No.: 306,433

[30] Foreign Application Priority Data
Nov. 29, 1971  France .............................. 71.42623

[52] U.S. Cl.......... 192/106.1, 192/106.2, 192/30 V, 64/27 F, 64/27 C
[51] Int. Cl. ......................... F16d 3/14, F16d 47/02
[58] Field of Search............ 192/106.1, 106.2, 30 V; 64/27 C, 27 F; 74/574

[56] References Cited
UNITED STATES PATENTS

| 1,952,892 | 3/1934 | Reed ................................ | 192/106.1 |
| 2,127,996 | 8/1938 | Havill ................................ | 64/27 F |
| 3,138,011 | 6/1964 | Stromberg ........................... | 64/27 F |
| 3,266,271 | 8/1966 | Stromberg .................. | 192/106.2 X |
| 3,534,841 | 10/1970 | Schneider et al. ................ | 192/106.2 |
| 3,578,121 | 5/1971 | Maurice ........................... | 192/106.2 |

Primary Examiner—Samuel Scott
Assistant Examiner—Lance W. Chandler
Attorney, Agent, or Firm—Young & Thompson

[57] ABSTRACT

A torsion-damping device, especially for a clutch friction-disc, for coupling together two parts for rotation with a relative elastically-braked angular displacement, one of the said parts comprising a central plate provided with passage means, while the other part comprises side plates disposed on each side of the central plate and interconnected by spacing members passing through the passage means with an angular clearance defining said displacement in both directions, windows being formed facing each other in the said plates and being intended to receive torsion-damping springs for coupling the plates together in rotation, while offering an elastic resistance to the said displacement, some of the windows facing each other in the central plate and in the lateral plates having different angular lengths in order to cause the corresponding spring to act only after part of the displacement, so as to obtain a progressive variation of the torque as a function of the displacement. High transmissible torque and good progressivity are obtained by increasing the number of windows and arranging the spacing members and/or their passage means closer to the axis of rotation than the windows. In an alternative form, the said passage means are constituted by radial extensions of certain windows in the central plate towards the axis of rotation.

8 Claims, 9 Drawing Figures

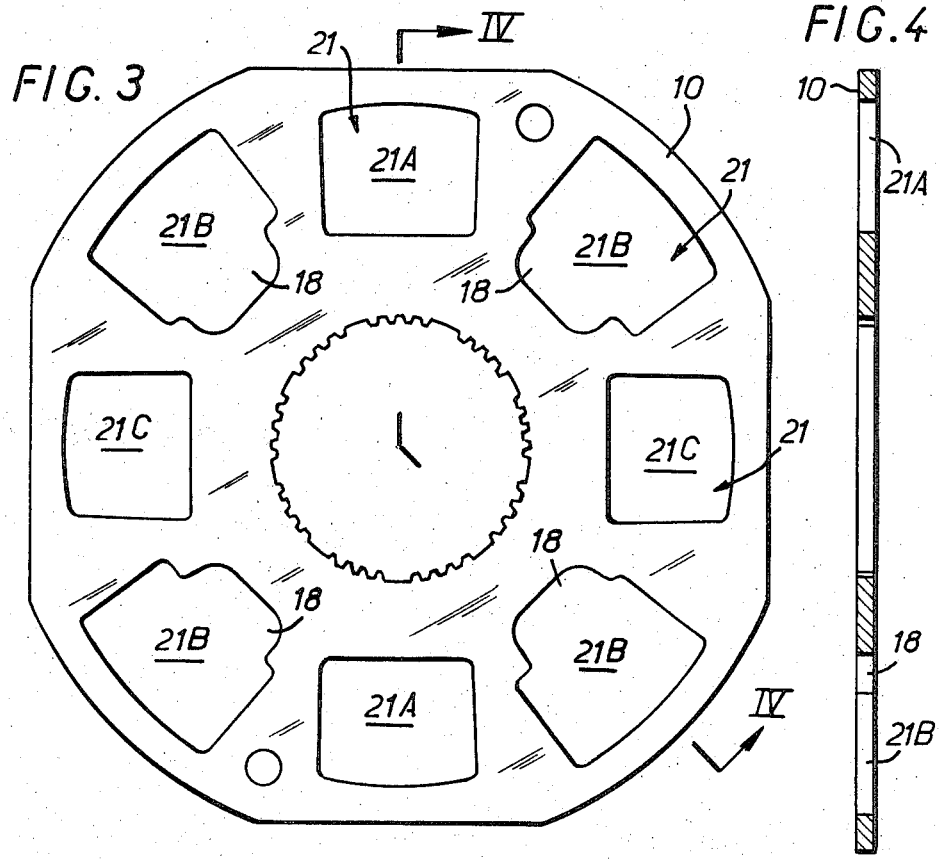
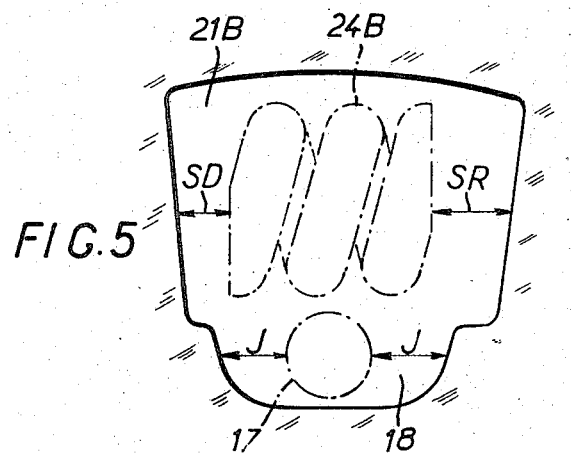

TORSION DAMPING DEVICE

The present invention relates to a torsion-damping device for coupling together two parts in rotation with a relative angular displacement which is elastically braked, in which one of the said parts comprises a central plate provided with passage means, while the other part comprises side plates arranged on each side of the central plate and which are interconnected by cross-members passing through the said passage means with an angular clearance defining the said displacement in both directions, windows being formed facing each other in the said plates and being intended to receive torsion-damping springs for coupling the plates together in rotation, while offering an elastic resistance to the said displacement.

The present invention relates more particularly to a torsion-damping device of such a kind, in which some of the windows provided facing each other in the central plate and in the lateral plates have different angular lengths in order to cause the corresponding springs to act only after a fraction of the displacement, for the purpose of obtaining a variation of the torque as a function of the displacement which is progressive, being shown for example by a curve in the form of a broken line.

The present invention relates more particularly to a clutch friction disc comprising a torsion-damping device, in which one of the parts coupled for rotation with an elastically-braked angular displacement comprises a hub, while the other part comprises friction linings.

For an overall dimension of given diameter of a clutch friction disc, it is in general difficult to obtain simultaneously a high transmissible torque and a good progressivity of the action.

The applicant has tried to combine these two conditions by increasing the number of windows. For example, in a disc having a diameter such that there are generally six windows in a disc, eight windows are provided instead of six.

It will be appreciated that with more windows, it is possible to provide more springs and therefore to obtain a greater transmissible torque, while at the same time the springs are brought into action in a more gradual manner in the resistance which they offer to the displacement.

It will be noted that the increase in the number of windows, for example eight instead of six, in a given diameter of the disc, introduces problems of mechanical strength, both for the central plate and for the lateral plates, since the more windows there are, the smaller become the full portions which provide the strength.

The Applicant has succeeded in producing a prototype which comprises a large number of windows, and which thus provides a high torque and good progression of the action, by utilizing means which ensure a judicious distribution of the open parts and the full portions which makes it possible to give the full portions a sufficient width appropriate to the desired strength.

The present invention has thus for its object a torsion damping device, especially for a clutch friction disc, which comprises the whole or part of these means and which has a large number of windows for the production of a high torque and/or a good progressive action.

According to one of the features of the invention, a torsion damping device is characterized in that the cross members and/or their passage means are arranged closer to the axis of rotation than the windows.

The invention has also for its object a torsion damping device as specified above, especially for clutch friction discs, said device being characterized in that the said passage means are constituted by radial extensions towards the axis of rotation of certain windows in the central plate.

It will readily be understood that the passage means formed in the central plate so as to receive the interconnection cross-bracers of the lateral plates, are additive to the windows in diminishing correspondingly the strong full portions. These passage means are in general constituted by slots formed in the periphery of the central plate, at precisely the points where the windows are located.

By bringing the passage means and/or the cross-bracers closer to the axis of rotation than the windows, the following advantages are obtained:
1. More room is left at the periphery for the windows and the springs;
2. For the same angular displacement, the passage means are smaller and leave more material;
3. The cross-bracers close to the axis can be employed for driving accessory devices, for example washers inserted between the plates;
4. A better performance of the plates.

According to another feature of the invention, in which some of the windows placed facing each other in the central plate and in the lateral plates have different angular dimensions, so as to cause the corresponding springs to act only after a portion of the displacement, the windows larger than those with which they are associated being provided in some cases in the central plate, and in other cases, in the lateral plates.

In general, the larger windows are all provided either in the central plate or in the lateral plate. The fact of having provided some windows in the central plate and others in the lateral plates in accordance with the invention makes it possible to distribute the largest open spaces between the various plates and thereby avoids excessive diminution of the portions which remain full.

The present invention has also for its object a clutch friction disc having a torsion damping device provided with means such as specified in one or the other of the various features referred to above.

These characteristic features are advantageously combined in a preferred form of construction of a clutch friction disc which will now be described by way of example, reference being made to the accompanying drawings, in which:

FIG. 3 is a view in elevation of the central plate;

FIG. 4 is a view of the central plate in cross-section taken along the broken line IV—IV of FIG. 3;

FIG. 5 is a view to a larger scale of one of the windows of the central plate, which comprises a radial extension for receiving the interconnection spacing member of the lateral plates, this spacing or bracing member being shown in chain-dotted lines, as is also the corresponding spring;

Figure 1:
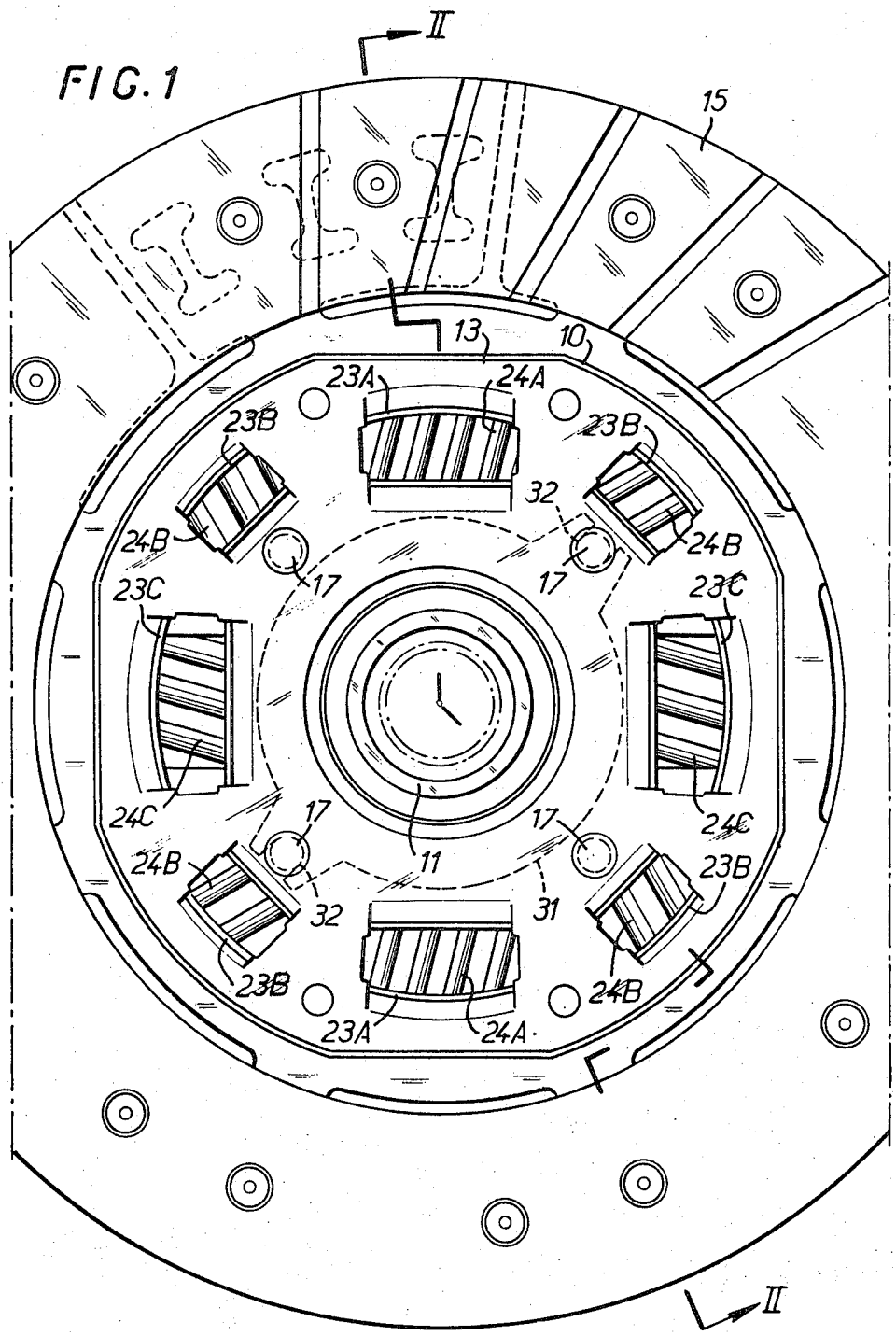
FIG. 1 is a view in elevation of a clutch friction disc having a torsion damping device in accordance with the invention, with parts broken away.

In the form of embodiment shown in FIGS. 1 to 8, a clutch friction disc comprises (see FIGS. 1 and 2) a central plate 10 rigidly fixed to a central hub 11 and to lateral plates 12 and 13 arranged on each side of the plate 10 and rigidly fixed to a plate 16 of larger diameter carrying peripheral friction linings 14 and 15.

Figure 2:
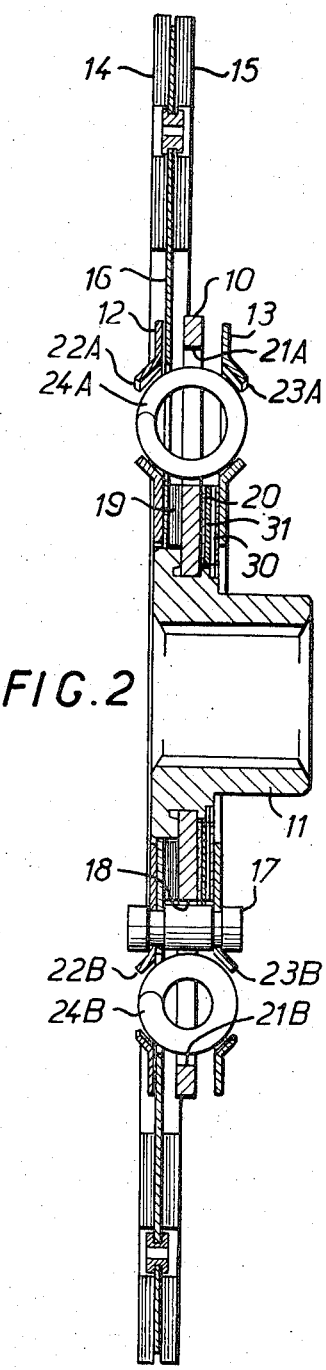
FIG. 2 is a view of this disc in cross-section taken along the broken line II—II of FIG. 1.
Figure 2A:
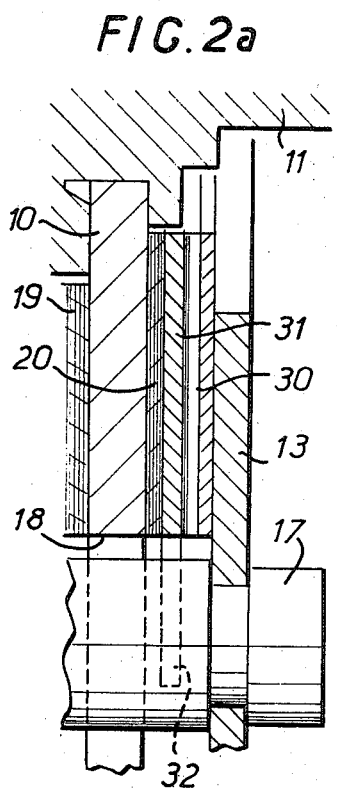
FIG. 2a is a detail view to a larger scale of a part of FIG. 2.
Figure 6:
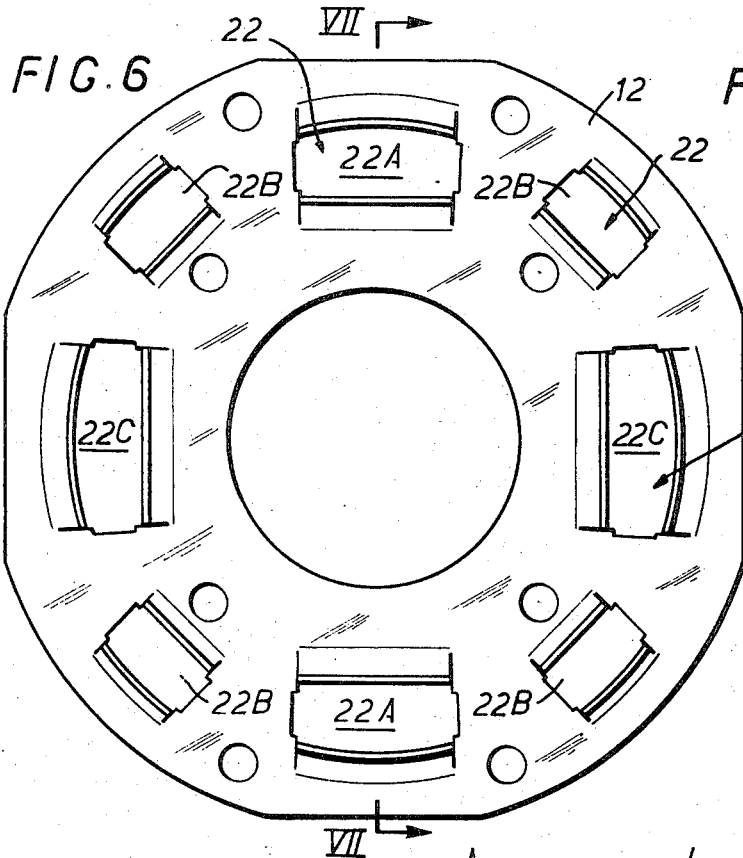
FIG. 6 is a view in elevation of one of the lateral plates.
Figure 7:
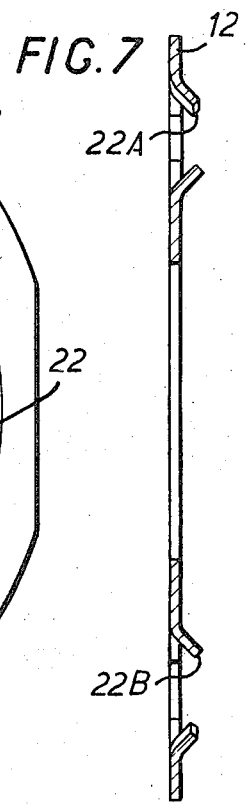
FIG. 7 is a view of this lateral plate in cross-section taken along the line VII—VII of FIG. 6.

The plates 12, 13 and 16 are assembled together by cross-members 17 which pass through passage means 18 formed in the plate 10. The cross-members 17 rigidly fix together the plates 12, 13 and 16 and keep them spaced apart by a constant distance. It will be appreciated that the plates 12 and 13 are exactly symmetrical and may therefore be produced by a single standard method of manufacture. It will also be noted that a friction washer 19 is interposed between the plate 10 and the plate 16 contiguous to the plate 12, while a friction washer 20 is intercalated between the plate 10 and the plate 13. The friction of the washers 19 and 20 is elastically calibrated by a corrugated washer 30 associated with a driving washer 31 rigidly fixed for rotation with the plates 12 and 13. The washers 30 and 31 are arranged between the plate 13 and the washer 20 in the order shown in FIG. 2a.

Windows 21, arranged in a circular row, are formed in the plate 10, while windows 22 and 23, also arranged in a circular row, are formed respectively in the plate 12 and in the plate 13. The various windows 21, 22 and 23 are placed facing each other and receive torsion damping springs 24 so as to couple the hub 11 and the fricton linings 14, 15 together for rotation.

A pre-determined clearance 2J (FIG. 5) is provided between each spacing member 17 and its passage means 18 so as to permit and to define in both directions, an angular displacement of the hub 11 with respect to the friction linings 14 and 15. This displacement is allowed to take place against the elastic resistance which the springs 24 provide in opposition to this movement.

As can more particularly be seen from FIG. 3, the windows 21 of the plate 10 are eight in number and comprise three sets of windows, identified by the letters A, B, C. The first set comprises two opposite windows 21A; the second set comprises four windows 21B at 90°; the third set comprises two opposite windows 21C. The various windows 21 are substantially equidistant from each other and are provided in the following order: 21A, 21B, 21C, 21B, 21A, 21B, 21C, 21B.

As can be seen from FIGS. 1 to 4, the cross-spacers 17 which interconnect the washers 12 and 13, and the passages 18 through which these spacing members 17 pass, are located closer to the axis of the disc than the windows 21. More precisely, the passages 18 are constituted by a radial extension towards th axis of the disc, of the windows 21B.

This arrangement offers various advantages as follows:

1. More room is left at the periphery for the windows 21 and the springs 24;
2. For the same angular displacement, the passages 18 are smaller and leave more material in the disc;
3. More convenient fixing for rotation of the driving washers 31 to the plates 12 and 13 by virtue of slots 32 in the washer 31, engaged directly on the cross spacers 17 which are quite close, at least two such slots 32 being provided to ensure the centering of the washer 31;
4. The cross-spacers, being close to the elastic zone of action of the washer 30, the risk of deformation of the plates 12 and 13 is minimized.

The windows 22 of the plate 12 (see FIG. 6) are eight in number and comprise three sets of windows which, as for the plate 10, are identified by the letters A, B and C. The first set comprises two opposite windows 22A; the second set comprises four windows 22B at 90°; the third set comprises two opposite windows 22C. The various windows 22 are substantailly equidistant and are placed facing the windows 21 of the plate 10, being arranged in the following order: 22A, 22B, 22C, 22B, 22A, 22B, 22C, 22B.

The windows 23 of the plate 13 are arranged exactly like the windows 22 of the plate 12 and comprise three sets of windows 23A, 23B and 23C.

Each of the windows 21A on the one hand, and each of the windows 22A and 23A on the other have exactly the same circumferential length, and the spring which they contain, indicated by 24A, is supported on both sides and at the same time on the windows 21A, 22A and 23A. The springs 24A are thus allowed to offer an elastic resistance from the beginning of and throughout the angular displacement, in both directions (section ODFG of the curve of FIG. 8 in the forward direction and the section OEH In the reverse direction).

Each of the windows 21C has a circumferential length which is smaller in both directions than that of each of the windows 22C and 23C, and the spring 24C which it receives is allowed to oppose its elastic resistance in both directions after the fractions of displacement (OD or OE) have been completed, and act in the section DFG in the forward direction and in the section EH in the reverse direction.

Each of the windows 21B has a circumferential length greater than that of each of the windows 22B or 23B. The additional length given by the window 21B is greater at SR in the reverse direction (FIG. 5) than at SD in the forward direction. In this way, the spring 24B received by the windows 21B, 22B, 23B is permitted to oppose its elastic resistance in the forward direction after the portion of travel ODF has been completed, and acts in the section FG (see FIG. 8). In the reverse direction, the springs 22B are inoperative.

It will be appreciated that the friction disc comprises certain windows of the same circumferential length in the plate 10 and in the plates 12 and 13, namely the windows 21A, 22A and 23A. The disc also comprises certain windows 21B which have a circumferential length greater in the plate 10 than the corresponding window 22B and 23B of the plates 12 and 13. The disc further comprises certain windows 22C and 23C in the plates 12 and 13 which have a circumferential length greater than the corresponding windows 21C of the plate 10.

In other words, the windows larger than those with which they are associated are provided in the plate 10 in the case of windows 21B, and in the plates 12 and 13 for the other windows 22C and 23C.

It will be observed that this arrangement makes it possible to distribute the additional lengths of the windows Between the plate 10 and the plates 12 and 13, and in consequence prevents excessive reduction of the portions remaining full in the various parts.

In the example shown, the hub 11 is rigidly fixed to the central plate 10 while the friction linings 14 and 15 are fixed on the lateral plates 12 and 13, but the opposite mounting could also be provided. The friction linings 14 and 15 may furthermore be directly carried by one of the plates 10, 12 or 13 instead of by the disc 16.

Figure 8:
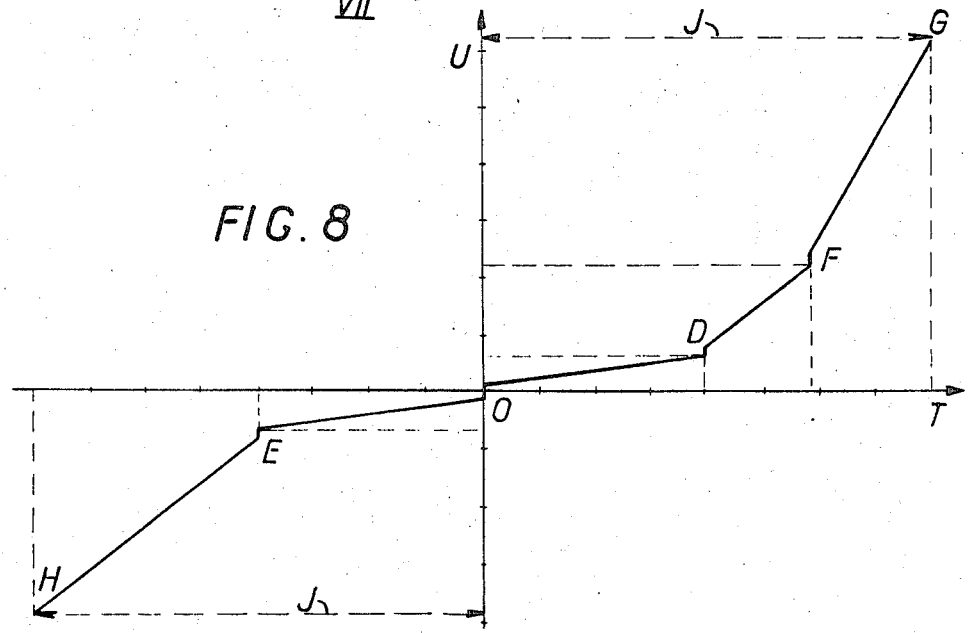
FIG. 8 is a diagram illustrating the variations of the torque plotted in ordinates O-U as a function of the displacement plotted in abscissae O-T.

It will also be understood that the curve of FIG. 8 has only been given purely by way of an illustrated example and may be modified if necessary.

Generally speaking, the invention is applied not only to clutch friction discs but also comprises any appropriate applications of the torsion damping device, for example couplings, etc.

What I claim is:

1. A torsion damping device for coupling together two parts for rotation with an elastically braked angular displacement, one of said parts comprising a central plate, the other of said parts comprising lateral plates disposed on each side of said central plate, said central plate having passage means therein, spacing means interconnecting said lateral plates and passing through said passage means with an angular clearance defining said displacement in both directions, said plates having windows facing each other, torsion damping springs in said windows for coupling together said plates for rotation while offering an elastic resistance to said displacement, said passage means being constituted by an extension of the windows in said central plate.

2. A torsion damping device as claimed in claim 1, said extension being radial and toward the rotation axis.

3. A torsion damping device as claimed in claim 1, certain said windows facing each other in said central plate and in said lateral plates have different angular lengths in order to cause the corresponding springs to act only after a fraction of said displacement, the windows longer than those with which they are associated being provided in said central plate for certain windows and in said lateral plates for other windows.

4. A torsion damping device as claimed in claim 3, said window extensions in the windows of said central plate having a larger angular length than those with which they are associated in said lateral plates.

5. A torsion damping device as claimed in claim 4, said extensions being radial and toward the rotation axis.

6. A clutch friction disc having a torsion damping device as claimed in claim 1, one of said parts comprising a hub and the other of said parts comprising friction linings.

7. A clutch friction disc as claimed in claim 6, said hub being rigidly fixed to the central plate, said friction linings being fixed on one of said lateral plates.

8. A clutch friction disc as claimed in claim 6, and an elastic washer, a driving washer and a friction washer between said plates, said driving washer being engaged with said spacing means.

* * * * *

REEXAMINATION CERTIFICATE (534th)

United States Patent [19]

Rist

[11] B1 3,817,362

[45] Certificate Issued Jul. 22, 1986

[54] TORSION DAMPING DEVICE

[75] Inventor: Michel Rist, Boulogne, France

[73] Assignee: Societe Anonyme Francaise Du Ferodo, Paris, France

Reexamination Request:
No. 90/000,867, Sep. 20, 1985

Reexamination Certificate for:
Patent No.: 3,817,362
Issued: Jun. 18, 1974
Appl. No.: 306,433
Filed: Nov. 14, 1972

[30] Foreign Application Priority Data

Nov. 29, 1971 [FR] France ............... 71.42623

[51] Int. Cl.[4] .................. F16D 3/14; F16D 47/02
[52] U.S. Cl. ................ 192/106.1; 192/30 V; 192/106.2; 464/68

[56] References Cited

U.S. PATENT DOCUMENTS

| | | | |
|---|---|---|---|
| 1,952,892 | 3/1934 | Reed | 192/106.1 |
| 2,124,013 | 7/1938 | Spase | 192/106.2 |
| 2,127,996 | 8/1938 | Havill | |
| 2,176,696 | 10/1939 | Wemp | 192/106.2 |
| 2,210,074 | 8/1940 | Friedman | |
| 2,251,128 | 7/1941 | Goodwin | |
| 2,277,558 | 3/1942 | Nutt | 192/106.2 |
| 2,291,405 | 7/1942 | Nutt | 192/106.2 |
| 2,309,950 | 2/1943 | Goodwin | 192/107 C |
| 2,964,930 | 12/1960 | Aira et al. | |
| 3,138,011 | 6/1964 | Stromberg | |
| 3,266,271 | 8/1966 | Stromberg | 192/106.2 X |
| 3,386,265 | 6/1968 | Kasaback | |
| 3,534,841 | 10/1970 | Schneider et al. | 192/106.2 |
| 3,556,273 | 1/1971 | Maucher | 192/106.2 |
| 3,578,121 | 5/1971 | Maurice | 192/106.2 |

FOREIGN PATENT DOCUMENTS

| | | |
|---|---|---|
| 1520684 | 3/1968 | France |
| 812001 | 4/1959 | United Kingdom |
| 955563 | 4/1964 | United Kingdom |
| 1099443 | 1/1968 | United Kingdom |
| 931971 | 7/1963 | United Kingdom |
| 1200013 | 7/1970 | United Kingdom |
| 1356160 | 6/1974 | United Kingdom |

*Primary Examiner*—Rodney H. Bonck

[57] ABSTRACT

A torsion-damping device, especially for a clutch friction-disc, for coupling together two parts for rotation with a relative elastically-braked angular displacement, one of the said parts comprising a central plate provided with passage means, while the other part comprises side plates disposed on each side of the central plate and interconnected by spacing members passing through the passage means with an angular clearance defining said displacement in both directions, windows being formed facing each other in the said plates and being intended to receive torsion-damping springs for coupling the plates together in rotation, while offering an elastic resistance to the said displacement, some of the windows facing each other in the central plate and in the lateral plates having different angular lengths in order to cause the corresponding spring to act only after part of the displacement, so as to obtain a progressive variation of the torque as a function of the displacement. High transmissible torque and good progressivity are obtained by increasing the number of windows and arranging the spacing members and/or their passage means closer to the axis of rotation than the windows. In an alternative form, the said passage means are constituted by radial extensions of certain windows in the central plate towards the axis of rotation.

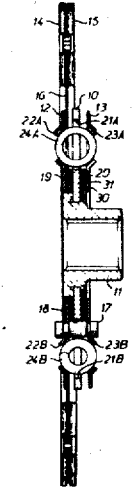

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, between lines 19 and 20, insert the following:

*As illustrated, the plates are devoid of thickened portions, that is, are of substantially constant thickness. They are planar but for conventional circumferentially extending and axially outwardly protruding flared portions in the lateral plates for accommodating the torsion damping springs. Each of the plates is of flat washerlike configuration and lies in a radial plane.*

AS A RESULT OF REEXAMINATION, IT HAS BEEN DETERMINED THAT:

The patentability of claims 1–8 is confirmed.

New claims 9–19 are added and determined to be patentable.

9. *A torsion damping device for coupling together two parts for rotation with an elastically braked angular displacement, one of said parts comprising a hub and a separate central plate secured to said hub, the other of said parts comprising lateral plates disposed on each side of said central plate, said central plate having passage means therein, spacing means interconnecting said lateral plates and passing through said passage means with an angular clearance defining said displacement in both directions, each of said plates having more than six windows facing each other, torsion damping springs in said windows for coupling together said plates for rotation while offering an elastic resistance to said displacement, said passage means being constituted by a radially inward extension of some of said windows in said central plate.*

10. *A torsion damping device according to claim 9, wherein said central plate is rigidly fixed to said hub.*

11. *A torsion damping device according to claim 9, wherein said plates are devoid of thickened portions.*

12. *A torsion damping device according to claim 9, wherein all of said plates are of substantially constant thickness and planar but for conventional circumferentially extending and axially outwardly protruding flared portions in said lateral plates for accommodating said torsion damping springs.*

13. *A torsion damping device according to claim 9, wherein each of said plates is of flat washer-like configuration.*

14. *A torsion damping device according to claim 9, wherein each of said plates is of substantially uniform thickness and lies in a radial plane.*

15. *A torsion damping device according to claim 9, wherein each of said plates has eight windows.*

16. *A torsion damping device according to claim 9, wherein the circumferential extent of some of said windows in said central plate is different from the circumferential extent of facing ones of said windows in said lateral plates for providing progressive torsion damping action.*

17. *A torsion damping device according to claim 9, wherein at least one circumferential end of at least some said windows in said central plate is circumferentially offset relative to the corresponding circumferential end of the facing windows in said lateral plates for providing progressive torsion damping action.*

18. *A torsion damping device according to claim 9, wherein a friction disc is fixed to one of said lateral plates.*

19. *A torsion damping device according to claim 9, wherein friction means are operatively disposed axially between said central plate and said lateral plate and having a portion attached for relative angular movement with said spacing means.*

* * * * *